(12) United States Patent
Louden et al.

(10) Patent No.: US 10,571,061 B2
(45) Date of Patent: Feb. 25, 2020

(54) INDEPENDENTLY HYDRAULICALLY CLAMPED AND SEALED FITTING

(71) Applicant: The Pipe Line Development Company, Westlake, OH (US)

(72) Inventors: Aaron Z. Louden, Lakewood, OH (US); Glenn Beard, North Olmsted, OH (US); Shon Joseph George Meenathethil, Cochin (IN)

(73) Assignee: THE PIPE LINE DEVELOPMENT COMPANY, Westlake, OH (US)

( * ) Notice: Subject to any disclaimer, the term of this patent is extended or adjusted under 35 U.S.C. 154(b) by 167 days.

(21) Appl. No.: 15/872,305

(22) Filed: Jan. 16, 2018

(65) Prior Publication Data

US 2019/0219210 A1 Jul. 18, 2019

(51) Int. Cl.
*F16L 37/62* (2006.01)
*F16L 17/10* (2006.01)

(52) U.S. Cl.
CPC ............... *F16L 37/62* (2013.01); *F16L 17/10* (2013.01)

(58) Field of Classification Search
CPC . F16L 37/62; F16L 17/10; F16L 17/02; F16L 37/02
See application file for complete search history.

(56) References Cited

U.S. PATENT DOCUMENTS

| 3,393,926 | A | * | 7/1968 | Arnold | F16L 37/002 285/18 |
|---|---|---|---|---|---|
| 3,598,429 | A | * | 8/1971 | Arnold | F16L 37/002 285/18 |
| 3,704,033 | A | | 11/1972 | Arnold | |
| 3,711,123 | A | * | 1/1973 | Arnold | F16L 37/002 285/18 |
| 3,713,204 | A | * | 1/1973 | Arnold | F16L 37/002 29/460 |
| 3,713,675 | A | * | 1/1973 | White, Jr. | F16L 37/002 285/3 |
| 3,744,822 | A | | 7/1973 | Arnold | |
| 3,784,234 | A | | 1/1974 | Mohr | |
| 3,830,526 | A | | 8/1974 | Mohr | |
| 3,843,167 | A | * | 10/1974 | Gronstedt | F16L 17/10 285/18 |
| 3,977,702 | A | * | 8/1976 | White, Jr. | F16L 37/002 285/18 |
| 3,986,728 | A | | 10/1976 | Marsh | |

(Continued)

FOREIGN PATENT DOCUMENTS

WO WO-2010021754 A1 * 2/2010 ............. F16L 17/10

*Primary Examiner* — David Bochna
(74) *Attorney, Agent, or Firm* — Pearne & Gordon LLP

(57) ABSTRACT

A pipe fitting comprising three annular coaxial sections including a grip section, middle section, and a seal section, the grip section and seal section being separately fixed to the middle section, an annular array of grips in the grip section, an annular semi-rigid seal in the seal section, a hydraulic grip actuator in the housing for radially constricting the grips into gripping engagement with an exterior of a pipe extending into the housing, and a hydraulic seal actuator hydraulically and mechanically independent of the grip actuator, for forcing the seal radially into engagement with an exterior of the pipe, a first mechanical lock for maintaining the grips in contact with the pipe and a second mechanical lock maintaining the seal in contact with the pipe.

6 Claims, 2 Drawing Sheets

(56) References Cited

U.S. PATENT DOCUMENTS

| | | | |
|---|---|---|---|
| 4,006,921 A * | 2/1977 | Mohr | F16L 37/002 |
| | | | 285/18 |
| 4,049,297 A | 9/1977 | Reneau | |
| 4,078,832 A | 3/1978 | Wittman | |
| 4,109,940 A * | 8/1978 | Reneau | F16L 17/10 |
| | | | 285/18 |
| 4,290,632 A * | 9/1981 | Manchester, Jr. | F16L 21/08 |
| | | | 285/15 |
| 4,381,868 A * | 5/1983 | Croy | E21B 33/03 |
| | | | 166/88.4 |
| 4,728,125 A * | 3/1988 | Reneau | F16L 37/002 |
| | | | 285/104 |
| 4,761,023 A * | 8/1988 | Troxell, Jr. | F16L 55/1608 |
| | | | 285/101 |
| 4,832,379 A | 5/1989 | Smith et al. | |
| 5,158,326 A | 10/1992 | Anderson et al. | |
| 5,433,482 A | 7/1995 | Baddour | |
| 5,456,501 A | 10/1995 | Reaux | |
| 2010/0047023 A1 | 2/2010 | Horne | |
| 2017/0241568 A1 | 8/2017 | Barker | |

\* cited by examiner

INDEPENDENTLY HYDRAULICALLY CLAMPED AND SEALED FITTING

BACKGROUND OF THE INVENTION

The invention relates to fittings useful in repairing and/or joining pipes.

PRIOR ART

Mechanically joined repair fittings, such as those for riser repair of submerged pipelines, are useful where it is impractical to weld. Prior pipe repair and maintenance fittings include mechanically clamped and sealed types as well as hydraulically clamped and sealed types. The mechanical type can require numerous bolt tightening steps making installation complicated and time consuming, particularly when done underwater. The hydraulic type can be expensive to produce, complicated in design, and difficult or not arranged to lock in place in a reliable and precise manner. There remains a need for a simplified, compact, independently hydraulically gripped and sealed pipe fitting.

SUMMARY OF THE INVENTION

The invention provides a pipe fitting that can be independently hydraulically gripped and sealed on a pipe with independent hydraulic systems to provide a high level of control over these operations. The hydraulic actuation of each of the gripping and sealing systems is through a single port connection, thereby greatly simplifying the efforts required of the installer. If desired, the hydraulic actuation can be performed through a line from a location remote from the fitting itself.

In the disclosed arrangement, each of the hydraulic gripping and sealing actuators is a single annular piston. The pistons can be mechanically locked in their respective extended gripping and sealing positions with infinite adjustment precision and no retraction movement. The grip and sealing functions, consequently, are not dependent on long term pressurization of the respective hydraulic circuits.

BRIEF DESCRIPTION OF THE DRAWINGS

FIG. 3 is a perspective view of an annular array of gripping segments.

DESCRIPTION OF THE PREFERRED EMBODIMENT

Figure 1:
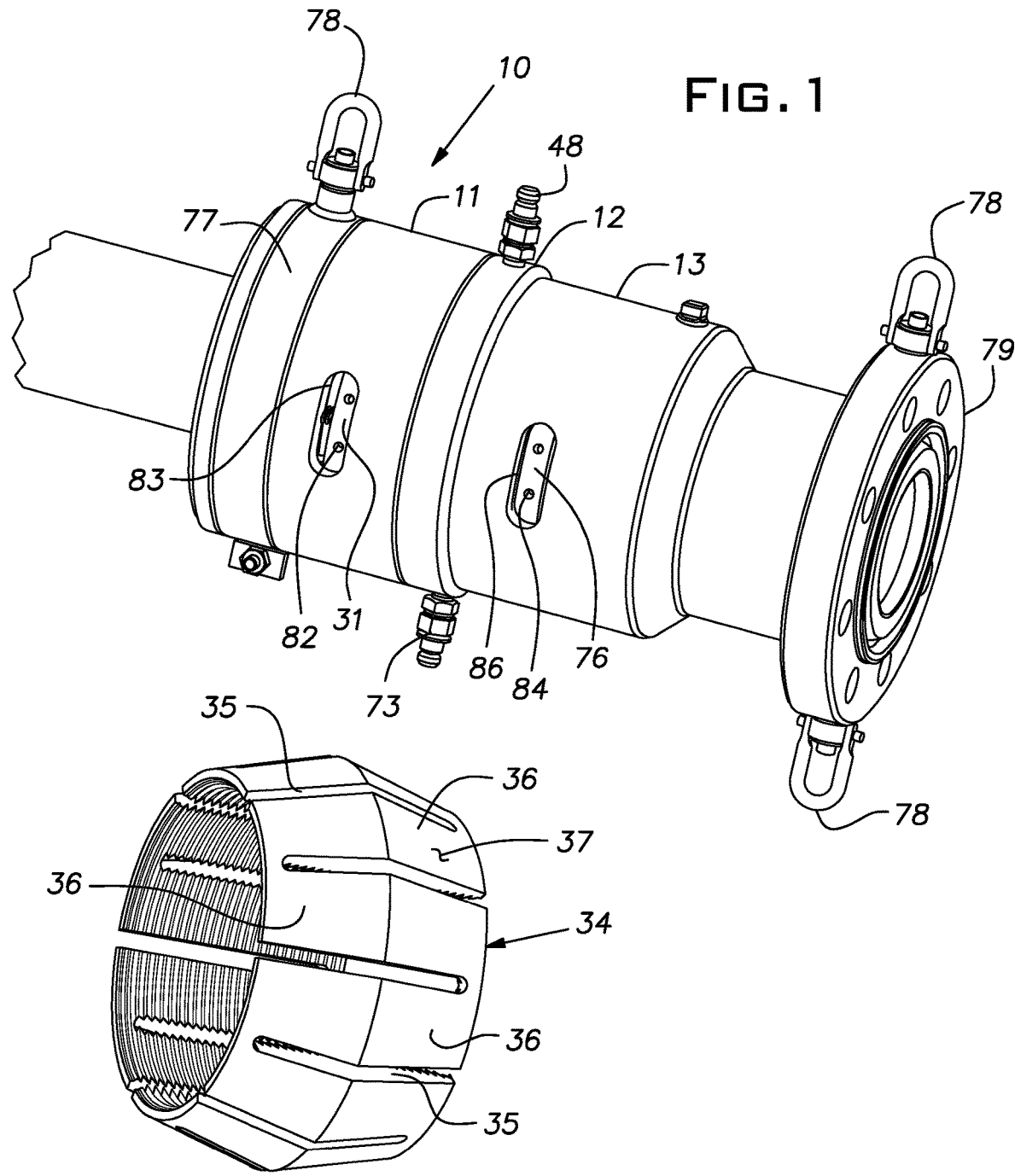
FIG. 1 is a perspective view of a pipe fitting constructed in accordance with the invention.
Figure 2:
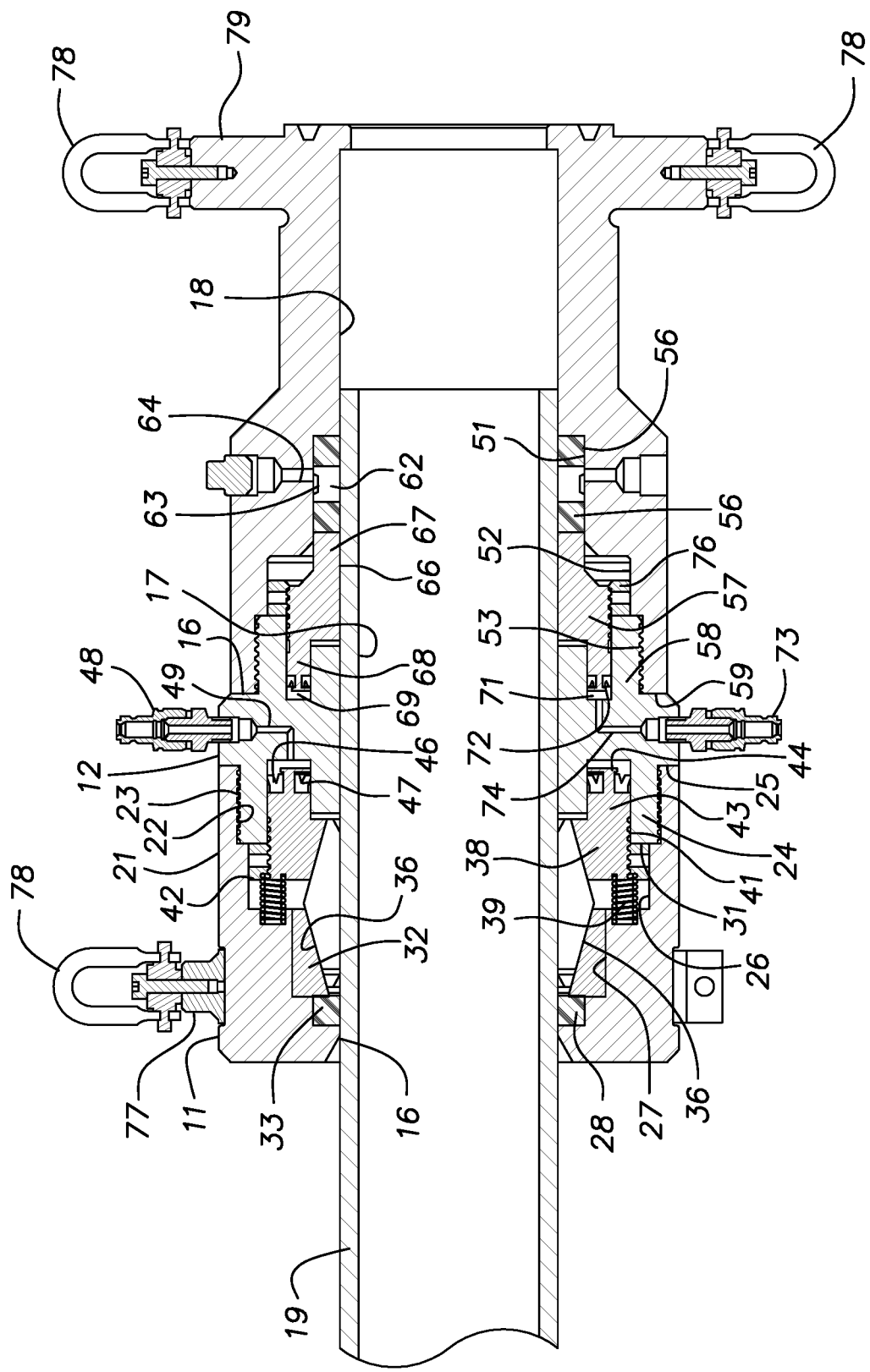
FIG. 2 is a longitudinal cross-section of the inventive fitting assembled on a pipe.

Referring now to the drawings, a pipe fitting 10 includes an axially extending circular housing formed by annular grip, middle, and seal sections 11-13, respectively. These parts and various other parts described hereinbelow are generally fabricated of steel, with the exception of seals, and are annular in form except for some accessories or small parts. The sections 11-13 are coaxial and each preferably has an inside diameter surface 16-18 adapted to receive the outside diameter of a steel pipe 19 with a loose slip or sliding fit.

A cylindrical skirt 21 on an inboard or inner end of the grip section 11 has internal threads 22 engaged with external threads 23 of a cylindrical extension 24 of the middle section 12. This enables the grip section 11 to be rigidly fixed to the middle section 12 with an end of the skirt 21 abutting a radial shoulder 25 of the middle section. The grip section 11 has several successive counterbores 26-28 inward of the internal skirt threads 22 for receiving a locking ring 31, an outer grip ring 32 and a seal 33, respectively. The seal 33 is an annulus of semi-rigid material, for example an elastomer, that fits on the exterior of the pipe 19 to exclude material from freely entering the housing or fitting 10 along the pipe exterior.

A grip ring 34 shown in perspective in FIG. 3 is slotted partially along the length of the ring from alternating ends of the ring to form grip or gripping segments 36. Slots 35 enable the grip ring 34 to constrict radially onto the exterior of the pipe 19 as will be discussed below. Interior faces of the segments 36 can be serrated or otherwise treated to enhance their gripping capacity on the pipe 19.

The segments 36 have a double-cone outer surface with one portion complementary to a conical bore of the outer grip ring 32 and an opposite portion complementary to a conical bore of a grip thrust ring in the form of an annular piston, hereinafter the grip piston 38. The grip piston 38 is disposed within the fitting 10 between the middle section 12 and grip section 11. The grip piston 38 is biased away from the grip ring 34 by a plurality of compression springs 39 distributed about the axis of the fitting and extending from associated pockets in the grip section body. An outside diameter of the grip piston 38 is threaded along a length 41 extending away from the middle section 12. The internally threaded locking ring 31 is engaged with the threads of the grip piston on the length 41.

A skirt 43 of the grip piston 38 is telescoped in an annular blind space 44 formed in the middle section 12 and which serves as a piston chamber. An end face of the skirt 43 is fitted with annular seals 46, 47 that seal against the radially outer and inner walls of the piston chamber 44, respectively. The chamber 44 is in fluid communication with a hydraulic coupler 48 through a passage 49.

The seal section 13, similar to the grip section 11, is a hollow circular body with a series of counterbores 51-53 for annular seals 56, a seal thrust ring or annular piston, hereafter seal piston 57 and annular extension 58 of the middle section 12 respectively.

The seal section 13 is rigidly fixed to the middle section 12 by engagement of respective internal threads on the counterbore 53 and external threads on the middle section annular extension 58 with an end face 59 of the seal section 13 abutting a radial shoulder surface 61 of the middle section 12. The seals 56 are a suitable semi-rigid elastomer, known in the industry. The seals 56 are separated by a metal spacer ring 62. A groove 63 on the outer periphery of the spacer ring 62 communicates with a test port in the wall of the seal section 13. The seal piston 57 receives the pipe 19 through its central bore 66. A reduced diameter end section 67 of the seal piston 57 extends into the counterbore 51. The seal piston 57 is proportioned to slide on the pipe 19 and in the counterbore 51. At an opposite end, the seal piston 57 has an annular extension 68, of increased inside diameter, received in an annular groove 69 formed in the adjacent face of the middle section 12. The annular groove 69 serves as a piston chamber for the seal piston extension 68. A pair of concentric seals 71, 72 on the seal piston extension 68, seal the piston chamber 69. A hydraulic coupler 73 at the exterior of the fitting 10 communicates with the piston chamber 69 through a passage 74. A mechanical locking ring 76 is internally threaded and is received on mating external threads on the outside surface of the seal piston 57.

A swivel lifting ring 77 is assembled in an external groove on the grip section 11. Hoist rings 78 are bolted to the seal section and swivel ring 77. The outboard end of the seal section 13 includes a flange 79 with bolt holes for connecting to a complementary flange of a pipe or other vessel. Other known connection or coupling structures, besides the illustrated flange 79, can be used with the disclosed fitting.

The fitting 10 is installed by stabbing the end of the pipe 19 into the fitting so that its end is past the seals 56 and is supported by the surface 18 of the seal section 13. Hydraulic fluid pressurized up to 3000 psi, for example, is introduced through the coupler 48 into the piston chamber 44. Hydraulic pressure on the piston skirt 43 causes the grip piston 38 to move axially in the fitting 10. A camming action between the conical surfaces of the grip piston 38 and complementary conical surfaces of the grip segments 36 causes the segments to constrict radially onto the exterior of the pipe 19. Limited axial movement of the grip segments 36 results in radial constriction of the distal or outboard length of the segments by camming action between the outer conical surfaces of the segments and inner conical surface of the outer grip ring 32. The grip piston 38 can be mechanically locked in the hydraulically extended position without regression of the grip piston by tightening the locking ring 31 threaded on the piston against the end face of the middle section 12. The threaded engagement between the locking ring 31 and grip piston affords infinite adjustment. The locking ring 31 has a series of spaced blind wrenching holes 82 distributed over its outer circumference as shown in FIG. 1. The locking ring 31 is manually turned on the piston threads 41 by engaging a hole 82 with a wrenching bar through a slot 83 in the wall of the grip section 11. The locking ring 31, when deployed as just described, holds the grip piston 38 in its extended position tight against the grip ring 34 without back-sliding when the chamber 44 is exhausted of pressurized fluid. If a need exists to remove the fitting 10 from the pipe 19, the ring 31 can be re-wrenched away from the middle section 12 and the springs 39 will retract the grip piston 38 to release the grips 36.

Pressurized hydraulic fluid, again, up to 3000 psi, for example, applied to the coupler 73 extends the seal piston 57 to axially compress and radially inwardly extend the seals 56 onto the exterior of the pipe 19. The spacer ring 62 is slidable in the counterbore 51 enabling it to transfer compressive force to the axially outer seal.

The sealing effectiveness of the seals 56 on the exterior of the pipe 19 can be tested by introducing a pressurized fluid into the test port 64 and observing whether leakage of such fluid through the seals occurs. When a seal is determined to be adequate, the lock ring 76 threaded on the seal piston 57 is rotated to tightly abut against the respective end of the middle section 12 to mechanically lock the seal piston in place. Blind holes 84 in the periphery of the locking ring 76, accessible through an arcuate slot 86 in the wall of the seal section 13 and are engaged with a manually manipulated pin or wrench from the outside of the fitting 10 to manually tighten the locking ring against the middle section 21 effectively with infinite adjustability afforded by the interengaged threads. Axial compression on the seals can be released by backing the locking ring 76 off the middle section. Both access slots 83, 86 can be closed with a suitable elastomeric plug or the like.

The piston area of the grip piston 38 is greater than that of the seal piston 57 so that where the same pressure source is used for each piston, the compressive strength of the seals 56 is not exceeded.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited. For example, the threaded holes 41 or their equivalents can extend through the wall of the segment 12 thereby eliminating the reduced diameter holes 43.

What is claimed is:

1. A pipe fitting comprising an annular housing, an annular array of arcuate gripping segments within the housing, a first annular piston and associated hydraulic chamber, an annular semi-rigid seal within the housing spaced axially from the gripping segments, a second annular piston and an associated hydraulic chamber mechanically and hydraulically isolated from the first annular piston and associated hydraulic chamber, first and second separate hydraulic circuits each extending from an exterior of the housing respectively to the hydraulic chamber of the first annular piston and the hydraulic chamber of the second annular piston, pressurized fluid introduced into the first hydraulic circuit being effective to forcibly move the first annular piston axially toward the gripping segments, wedging surfaces being arranged to radially constrict the gripping segments onto a pipe extending into the housing and thereby axially restrain the pipe in the housing in response to axial movement of the first annular piston towards the gripping segments, pressurized fluid introduced into the second chamber being effective to forcibly move the second annular piston axially toward the semi-rigid seal to axially compress the seal so that it radially constricts and seals onto the exterior of the pipe in the housing, an exterior of the first annular piston being threaded and an internally threaded locking ring being assembled on the first annular piston threads, the locking ring being rotatable on the first annular piston to lock the first annular piston in an extended position to mechanically hold the gripping segments in engagement with the pipe exterior.

2. A pipe fitting comprising an annular housing, an annular array of arcuate gripping segments within the housing, a first annular piston and associated hydraulic chamber, an annular semi-rigid seal within the housing spaced axially from the gripping segments, a second annular piston and an associated hydraulic chamber mechanically and hydraulically isolated from the first annular piston and associated hydraulic chamber, first and second separate hydraulic circuits each extending from an exterior of the housing respectively to the hydraulic chamber of the first annular piston and the hydraulic chamber of the second annular piston, pressurized fluid introduced into the first hydraulic circuit being effective to forcibly move the first annular piston axially toward the gripping segments, wedging surfaces being arranged to radially constrict the gripping segments onto a pipe extending into the housing and thereby axially restrain the pipe in the housing in response to axial movement of the first annular piston towards the gripping segments, pressurized fluid introduced into the second chamber being effective to forcibly move the second annular piston axially toward the semi-rigid seal to axially compress the seal so that it radially constricts and seals onto the exterior of the pipe in the housing, an exterior of the second annular piston being threaded and an internally threaded locking ring being assembled on the second annular piston threads, the locking ring being rotatable on the second annular piston to lock the second annular piston in an extended position to mechanically hold the annular semi-rigid seal in axial compression.

3. A pipe fitting comprising an annular housing, an annular array of arcuate gripping segments within the housing, a first annular piston and associated hydraulic chamber, an annular semi-rigid seal within the housing spaced axially from the gripping segments, a second annular piston and an associated hydraulic chamber mechanically and hydraulically isolated from the first annular piston and associated hydraulic chamber, first and second separate hydraulic circuits each extending from an exterior of the housing respectively to the hydraulic chamber of the first annular piston and the hydraulic chamber of the second annular piston, pressurized fluid introduced into the first hydraulic circuit being effective to forcibly move the first annular piston axially toward the gripping segments, wedging surfaces being arranged to radially constrict the gripping segments onto a pipe extending into the housing and thereby axially restrain the pipe in the housing in response to axial movement of the first annular piston towards the gripping segments, pressurized fluid introduced into the second chamber being effective to forcibly move the second annular piston axially toward the semi-rigid seal to axially compress the seal so that it radially constricts and seals onto the exterior of the pipe in the housing, said annular array of gripping segments comprising segments with a double taper outer surface whereby the segments collectively form a minimum outside diameter of the annular array at opposite axial ends of the array and a maximum outside diameter at a mid-length of the array, an outer grip ring in the housing on a side of the array opposite the annular piston, the grip ring and annular piston having conical bores, the grip segment outer surface being complementary to both the grip ring conical bore and the annular piston conical bore.

4. A pipe fitting comprising three annular coaxial sections including a grip section, middle section, and a seal section, the grip section and seal section being separately fixed to the middle section, an annular array of grips in the grip section, an annular semi-rigid seal in the seal section, a hydraulic grip actuator in the housing for radially constricting the grips into gripping engagement with an exterior of a pipe extending into the housing, and a hydraulic seal actuator hydraulically and mechanically independent of the grip actuator, for forcing the seal radially into engagement with an exterior of the pipe, a first mechanical lock for maintaining the grips in contact with the pipe and a second mechanical lock maintaining the seal in contact with the pipe, the grip and seal actuators including respective annular pistons, said mechanical locks being arranged to maintain the annular pistons in extended deployed positions independently of hydraulic pressurization of said actuators, said mechanical locks each being internally threaded rings threaded onto external threads of a respective annular piston.

5. A pipe fitting comprising an annular array of grips in the fitting, an annular semi-rigid seal in the fitting, an axially displaceable hydraulically actuated grip actuator in the housing for radially constricting the grips into gripping engagement with an exterior of a pipe extending into the fitting, and an axially displaceable hydraulic seal actuator, hydraulically and mechanically independent of the grip actuator, for forcing the seal radially into engagement with an exterior of the pipe, one of said actuators being annular and concentric with an axis of the pipe, an internally threaded mechanical locking ring engaged with external threads on said one actuator arranged to mechanically axially lock said one actuator in a deployed position.

6. A pipe fitting as set forth in claim 5, wherein another of said actuators is annular and concentric with the axis of the pipe, a second internally threaded mechanical locking ring engaged with external threads of said another actuator arranged to mechanically axially lock said another actuator in a deployed position.

\* \* \* \* \*